US012005551B2

(12) United States Patent
Sisk et al.

(10) Patent No.: US 12,005,551 B2
(45) Date of Patent: Jun. 11, 2024

(54) ADJUSTABLE PIVOT BOLT FOR A SEALED MANHOLE CLAMP

(71) Applicants: David E Sisk, Bonne Terre, MO (US); Peter Kemp, St. Louis, MO (US); Jason Husky, Park Hills, MO (US)

(72) Inventors: David E Sisk, Bonne Terre, MO (US); Peter Kemp, St. Louis, MO (US); Jason Husky, Park Hills, MO (US)

( * ) Notice: Subject to any disclaimer, the term of this patent is extended or adjusted under 35 U.S.C. 154(b) by 1137 days.

(21) Appl. No.: 16/873,236

(22) Filed: Mar. 2, 2020

(65) Prior Publication Data

US 2020/0282521 A1 Sep. 10, 2020

Related U.S. Application Data

(60) Provisional application No. 62/919,379, filed on Mar. 7, 2019.

(51) Int. Cl.

| | |
|---|---|
| ***B25B 5/04*** | (2006.01) |
| ***B25B 5/10*** | (2006.01) |
| ***B25B 5/14*** | (2006.01) |
| ***B61D 17/16*** | (2006.01) |
| ***B65D 90/00*** | (2006.01) |

(52) U.S. Cl.
CPC .................. *B25B 5/04* (2013.01); *B25B 5/10* (2013.01); *B25B 5/145* (2013.01); *B61D 5/08* (2013.01); *B61D 17/16* (2013.01)

(58) Field of Classification Search
CPC .. B25B 5/04; B25B 5/10; B25B 5/145; B61D 5/08; B61D 17/16
USPC .......................................................... 292/256
See application file for complete search history.

(56) References Cited

U.S. PATENT DOCUMENTS

| | | | | |
|---|---|---|---|---|
| 4,889,056 | A * | 12/1989 | Stewart | B61D 5/08 220/314 |
| 5,409,321 | A * | 4/1995 | Chen | B62K 25/02 403/321 |
| 6,595,716 | B1 * | 7/2003 | Van | B65D 90/10 404/26 |
| 7,427,089 | B2 * | 9/2008 | Silverio | E05B 65/001 292/256.5 |
| 9,260,118 | B2 * | 2/2016 | Douglas | B61D 5/08 |
| 10,029,705 | B2 * | 7/2018 | Schmidt | B61D 5/08 |
| 10,800,009 | B2 * | 10/2020 | Grobbel | B25B 5/08 |
| 2006/0027956 | A1 * | 2/2006 | Adoline | F16F 9/0218 267/70 |
| 2013/0049381 | A1 * | 2/2013 | Hageman | B61D 5/08 292/212 |

(Continued)

*Primary Examiner* — Kristina R Fulton
*Assistant Examiner* — James Edward Ignaczewski
(74) *Attorney, Agent, or Firm* — Sandberg Phoenix & von Gontard, PC.

(57) ABSTRACT

A sealed manhole clamp securing a manhole cover to a weld ring, including a lever assembly, the lever assembly having a lever arm and a cam, a pivot bolt, the pivot bolt having a cylindrical upper portion, and a lower portion, the lower bolt portion threadedly engages upwardly within the cylindrical upper portion of the pivot bolt, the cylindrical upper portion being pivotally pinned to the lever arm, the lower bolt portion being pivotally mounted to a seal ring, wherein since the lower bolt portion threadedly engages within the cylindrical upper portion, the entrance of any debris, dust, or moisture is prevented from entering the region of this threaded engagement of the pivot bolt components.

17 Claims, 3 Drawing Sheets

(56) References Cited

U.S. PATENT DOCUMENTS

| | | | | |
|---|---|---|---|---|
| 2013/0187322 | A1 * | 7/2013 | Woods | B25B 5/04<br>269/285 |

* cited by examiner

ADJUSTABLE PIVOT BOLT FOR A SEALED MANHOLE CLAMP

CROSS REFERENCE TO RELATED APPLICATIONS

This application claims priority to U.S. Provisional Patent Application Ser. No. 62/919,379, filed on Mar. 7, 2019, the disclosure of which is incorporated herein by reference.

FIELD OF DISCLOSURE

This disclosure generally relates to a manhole cover, as applied to its weld ring or other supporting structure, for use upon a tank trailer or dry bulk trailer or other conveying vehicle, wherein the lever assemblies used to hold the manhole cover sealed in place, incorporate a pivot bolt, wherein its adjustability through the use of a threaded pivot bolt, where the threads are sealed internally of its structure, prevents exposure of its adjustment to any of the deleterious materials being conveyed, or inclement weather conditions, to assure that adjustability can be subsequently achieved, for each lever assembly, during its usage and application.

BACKGROUND OF THE DISCLOSURE

Granular product, such as grain or corn, may be stored or shipped in bulk containers such as tank trailers, railroad tank cars, and pipelines for transportation from one site to be delivered to another. Such granular products may include farm produced grains, and many other dry bulk materials, such as cement, granular chemical products, and related type of conveyed materials, which during their processing, as is known, the dust and grime can easily cover substantially all of the various components that are used in their transit. Even with a manhole cover that seals upon the conveying vehicle, usually upon its weld ring, such are exposed to many of the residual materials being conveyed, during processing, and also, since their lever assemblies are provided upon the upper portion of such a manhole cover, or a plurality of them, these are also exposed to inclement weather conditions, throughout their usage.

Dry bulk trailers have manhole cover assemblies that allow access to the vessel, or trailer, for loading and inspection. The lids are held down with cam handles that compress a gasket to seal the vessel in its upper regions. In use, the manhole covers require periodic adjustment to compensate for the compression set and loss of resilience of the gasket material that seals the cover to its supporting structure.

Current state of the art cams, formed of the lever assemblies, are held in place with pivot bolts that have exposed threads that corrode as they are exposed to the elements, and also to the product that is spilled from the tank trailer, during its filling or unloading. Such corrosion causes the threads to cease to turn and makes further adjustment impossible, after a period of time.

As is well known in the art, where a manhole hardware is removed from the trailer, after an extended period of time of usage, the exposed threads, that normally would lead towards the adjustability of the hardware, seize in place, and will not allow any further adjustment to the lever assembly, for future usage. Hence, the only alternative in the art is simply to replace the entire assembly, in the form of the adjustment bolt, that will just not allow any further manipulation to adjust the amount of pressure that is applied by the lever assembly, upon its associated manhole cover, when sealing it upon its opening into the tank trailer or conveying vessel.

Examples of such prior art cam lever assemblies can be seen in the U.S. Pat. No. 6,595,716, to VanDeVyvere et al, which shows such an assembly. As is noted, it can be seen that the pivot bolt that holds the cam lever in position, has an exposed threaded bolt, that secures into a lower connector, which means that the exposure of these components to the atmosphere, weather conditions, and any of the granular material being conveyed or delivered into or discharged from its associated vehicle container, will be exposed to these conditions, and will eventually fail, if not corrode, after prolonged usage.

The U.S. Pat. No. 7,427,089, shows a similar type of apparatus provided for securing a hatch cover to the vessel of a railroad car, and wherein its cam shaft has an upper threaded securing member exposed to the elements, and the dust from the granular material being conveyed and processed, which does lead towards corrosion, and clogging, and an eliminating of the adjustability of the securing means, after prolonged usage. These are examples of the early types of adjustable connectors that have been used in the prior art, and which have led towards their eventual deterioration, and non-usage, because of the exposure of the adjustable aspects of the bolt, to the environment, leading towards their corrosion, which prevents any further adjustability in the sealing of its manhole and hatch covers onto the conveying vessel.

The present disclosure is designed to obviate and overcome many of the disadvantages and shortcomings as experienced with prior manhole covers. Moreover, the present disclosure is related to a manhole cover, and the ability to attain complete sealing onto its weld ring or related supporting structure, and which can sustain its adjustability, in its securement, and sealing onto the weld ring, even after very prolonged usage and application.

SUMMARY OF THE DISCLOSURE

The present disclosure is directed to a manhole cover device, which is secured by a series of lever assemblies onto its seal ring, or other structure, provided through the top portion of the tank trailer, dry bulk trailer, or other conveying vehicle, and more specifically, relates to the effective combination of structures forming the pivot bolt that secures with the handle or levers that clamp the cover or latch onto the tank trailer or railway car, during conveyance. More specifically, the sealed manhole clamp of the present disclosure relates to the formation of that pivot bolt, in a manner that conceals its adjustable threaded engagement of its various components together, so as to prevent access of the dry bulk material, dust, or even inclement weather in attaining access to the components threaded engagement, to prevent its corrosion, clogging, that maintains the possibility of attaining further adjustment to the lever assemblies, even after sustained usage.

A further feature of the sealed manhole clamp, and more specifically with respect to structure of its pivot bolt, that holds the lever assembly, and its manhole cover to the weld ring of the vessel, is that the threaded engagement between the components of the pivot bolt are sealed by means of an O-ring, to even further prevent the access of moisture to their threaded engagement, and which allows for sustained adjustability, after prolonged usage. In addition, and to prevent the entrance of any dust or other debris from attaining access to this threaded relationship, within the pivot bolt structure. In formation, and to attain the benefits of the sealed manhole clamp of the present disclosure, the bottom end of the upper cylindrical member for the bolt, which receives the threaded bolt extending upwardly through its bottom end, for threaded engagement upwardly therein, allows for adjustability in the length of the bolt, and that bottom has a scraper like configuration, which when the pivot bolt is adjusted, it scrapes away any dust or debris that may have accumulated thereat, so as to further prevent its entrance into the adjustment feature of the threaded engagement between the bolt components, even after sustained usage and application.

The present sealed manhole clamp provides a manhole cover device, held by lever assemblies onto the upper opening into the tank trailer, and the like, where the adjustable components that make up the pivot bolt are sealed from the elements, and thereby provide for adjustment over a more sustained and lengthy period of time, throughout the life of the assembled structure.

A further object of the present sealed manhole clamp is to provide means for sealing the threaded engagement of the various components that make up the pivot bolt for the lever assemblies, so as to prevent their corroding or deterioration even after prolonged usage.

A further object of the sealed manhole clamp is to provide means for sealing the operative components of the pivot bolt for a lever assembly holding a manhole cover onto its supporting structure at the top of a tank trailer, railway car, or the like.

Yet another object of the sealed manhole clamp is to provide means for sealing the adjustable components of the lever assembly of a manhole cover through the designed application of O-rings, scraper like elements, and related structures that prevent the entrance of inclement weather, dust, or other debris to the operating threads of the adjustable pivot bolt.

These and other objects may become more apparent to those skilled in the art upon review of the Summary of the Disclosure as provided herein, and upon undertaking a study of the Description of Its Preferred Embodiment, in view of the drawings.

DESCRIPTION OF A PREFERRED EMBODIMENT

Figure 1:
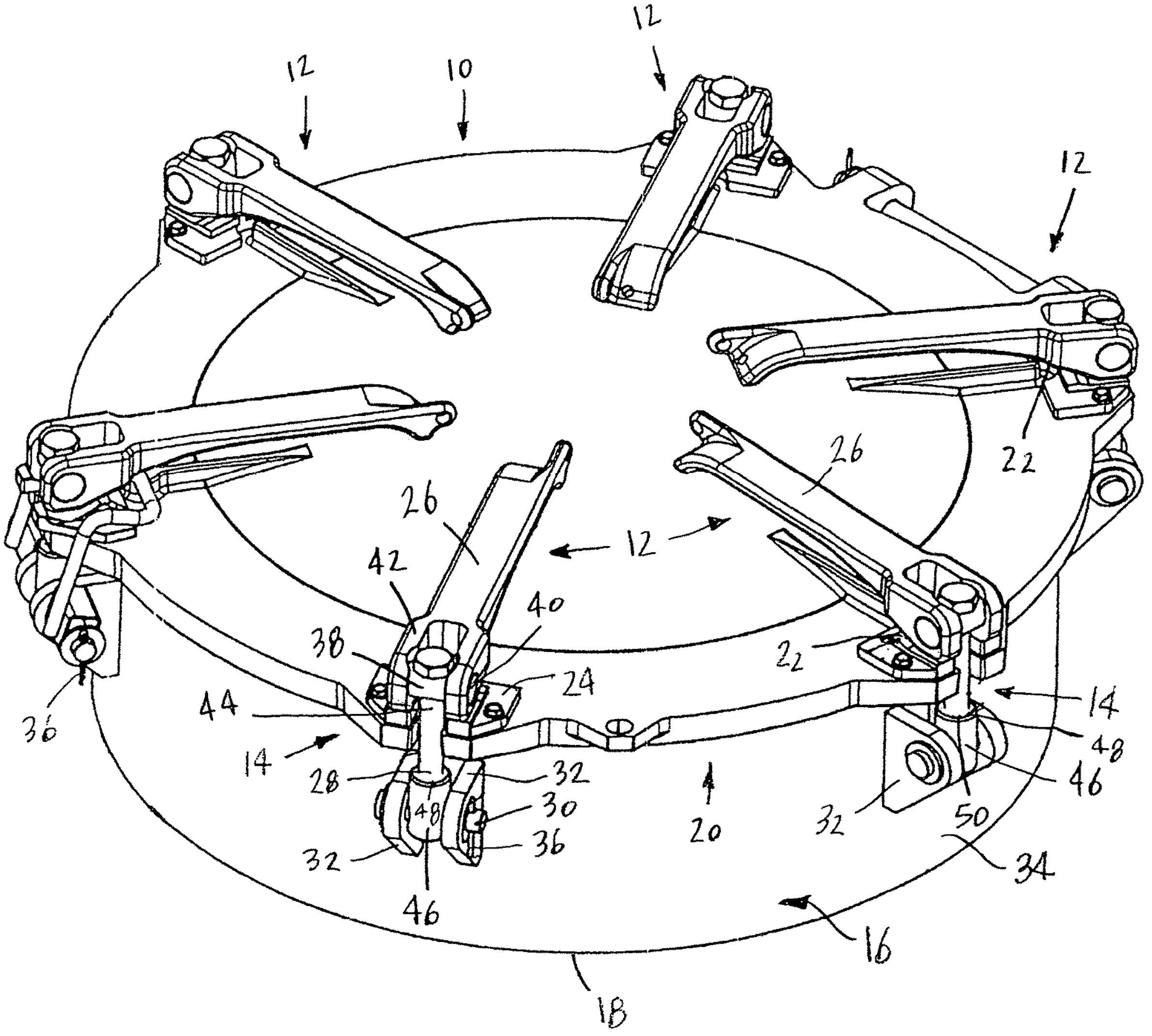
FIG. 1 shows a standard manhole type cover applied onto its weld ring normally secured to the top of a tank trailer, or the like, and showing prior art pivot bolts as currently used in the industry.
Figure 3:
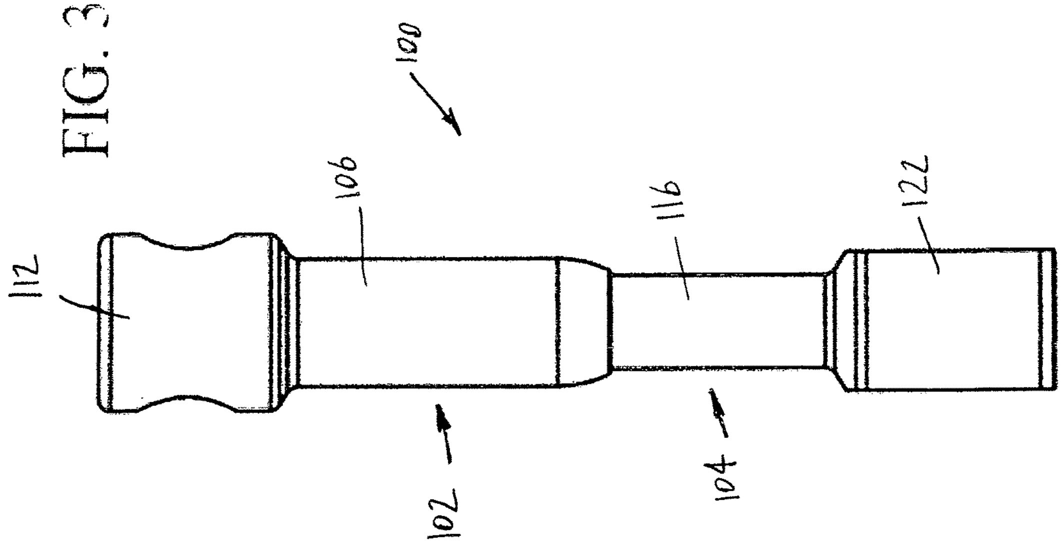
FIG. 3 is a front view of the adjustable pivot bolt of this disclosure.
Figure 2:
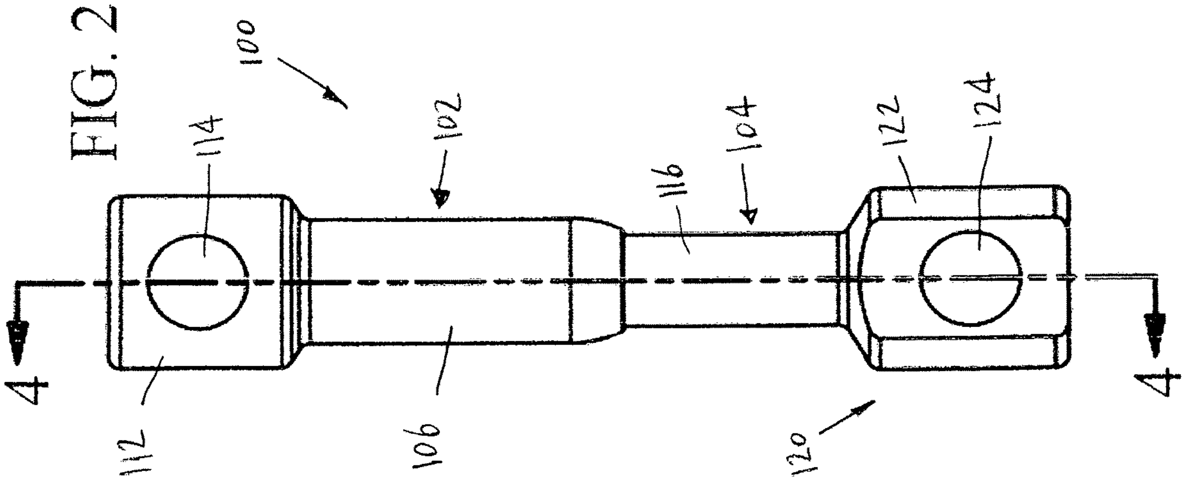
FIG. 2 shows a side view of the adjustable pivot bolt constructed according to the present disclosure used in the manhole hardware.

In referring to FIG. 1, therein is shown a manhole cover 10 that is secured by a number of lever cam assemblies 12, and showing the prior art style of a number of pivot bolts 14 that secure the lever cam assemblies 12 and the cover onto a seal ring 16, or other structure, provided atop a tank trailer or vessel 18 surrounding an opening 20 normally provided into such a vessel 18. Such lever cam assemblies 12, which include a number of camming surfaces 22, are designed to bind upon a cover plate 24, when a number of lever arms 26 associated with each of the lever cam assemblies 12 are pivoted into closure and into the position as noted in said FIG. 1. The pivot bolts 14 each have a bottom 28 which are secured by means of a pivot pin 30 to a number of corresponding mounts 32, that are affixed to a side 34 of the seal ring 16, as noted, and the pivot pin 30 can be removed, upon removal of a cotter pin 36, as can be understood. Each of the lever cam assemblies 12 has an upper part 38 that further includes a second pivot pin 40, that extends through a bifurcated end 42 of the lever arm 26, and further through an upper part 44 of the pivot bolt 14, as can be noted.

What is to be noted for the prior art style of pivot bolt 14, as further noted in FIG. 1, is that the pivot bolt 14 threadedly engages into a cooperating lower sleeve like portion 46, and as can be seen, and an upper end 48 of the sleeve 46, has the lower portion 28 of the bolt 14 threaded downwardly into said sleeve 46, which means that any dust, debris, or even inclement weather conditions, can permeate into a gap 50, and attain access to any threaded engagement provided therein, that normally leads to failure of the adjustability feature to the pivot bolt 14, when further adjustment is needed to the same, during prolonged usage and application of the lever cam assemblies 12, in holding such a manhole cover or latch 10, onto its supporting structure or seal ring 16. It is this detrimental feature in the design of the long used prior art style of pivot bolt 14 that the current disclosure has been conceived of, in order to remedy the conditions that lead to corrosion between the engagement of the threaded parts of the pivot bolt 14, after a period of time.

The style of hardware used for a pivot bolt 100 of the present disclosure can be seen in FIGS. 2-5. As noted, the pivot bolt 100 is fabricated of two components for use in a vertically upright orientation, initially an upper cylindrical portion 102 and a lower bolt portion 104 as shown in FIGS. 2-5. The upper cylindrical portion 102 is formed of a cylinder 106, having a channel 108 provided centrally therein, and which contains a series of internal threads 110 inside the channel 108 as noted in FIGS. 2-5. Integrally formed on the upper cylinder member 102 is a boss like member 112 having an aperture 114 provided there through, and which accommodates the locating of a pivot pin there through, such as the second pivot pin 40 shown in FIG. 1, which pivot pin 40 further connects with the bifurcated arm 42 of the lever arm 26.

The lower bolt portion 104 of the pivot bolt 100 is positioned below the cylindrical upper portion 102 and includes a length of shaft 116 that also includes external, male threads as at 118, positioned and completely contained inside the internally threaded channel 108 and which threadedly engage with the internal threads 110 at the interior upper cylindrical like member 106, as previously explained and shown in FIGS. 2-5. As shown in FIGS. 2-5, the threaded portion 118 of the lower bolt portion 104 threadedly engages with the internal threads 110 in the interior of the upper cylindrical portion 102 and does not extend outside the internally threaded channel 108 of the upper cylindrical portion 102. A bottom 120 of the lower bolt portion 104 includes a further boss like member 122 which includes an aperture 124, provided there through, and which accommodates the location of the pivot pin 30, as previously reviewed in FIG. 1.

Hence, when adjustability in the length of the pivot bolt 100 is required, as can be understood, its lower bolt portion 104 having threaded further inwardly of the upper cylindrical portion 102, can be turned to either shorten the length of the pivot bolt 100, or lengthen its length, as may be required in the adjustment of the pivot bolt 100 to provide for effective usage of the lever arms 26 and its camming surface 22, upon the cover 10, as previously explained.

But what is significant is that the channel 108 into the upper cylindrical portion 102, opens downwardly at the bottom end 138 of the upper cylindrical portion 102, as noted at 126, and the threaded portion 118 of the lower bolt portion 104, as noted at 128, extends upwardly into the channel 108. Hence, this is directly opposite from the exposure provided between the sleeve 46, and the bolt 14, as described in FIG. 1, particularly along the upper end of the sleeve, as noted at 48, as previously reviewed. Thus, there is no upwardly exposed entrance to the threaded engagement between the lower bolt portion 104, within the upper cylindrical portion 102, and thus, prevent the entrance of any dust, debris, or moisture from inclement weather, into the adjustable pivot bolt 100 of this disclosure. The structure of the pivot bolt 100 is directly opposite from the relationship of the various components that make up the pivot bolt 14 of the prior art, as previously defined in FIG. 1.

Figure 5:
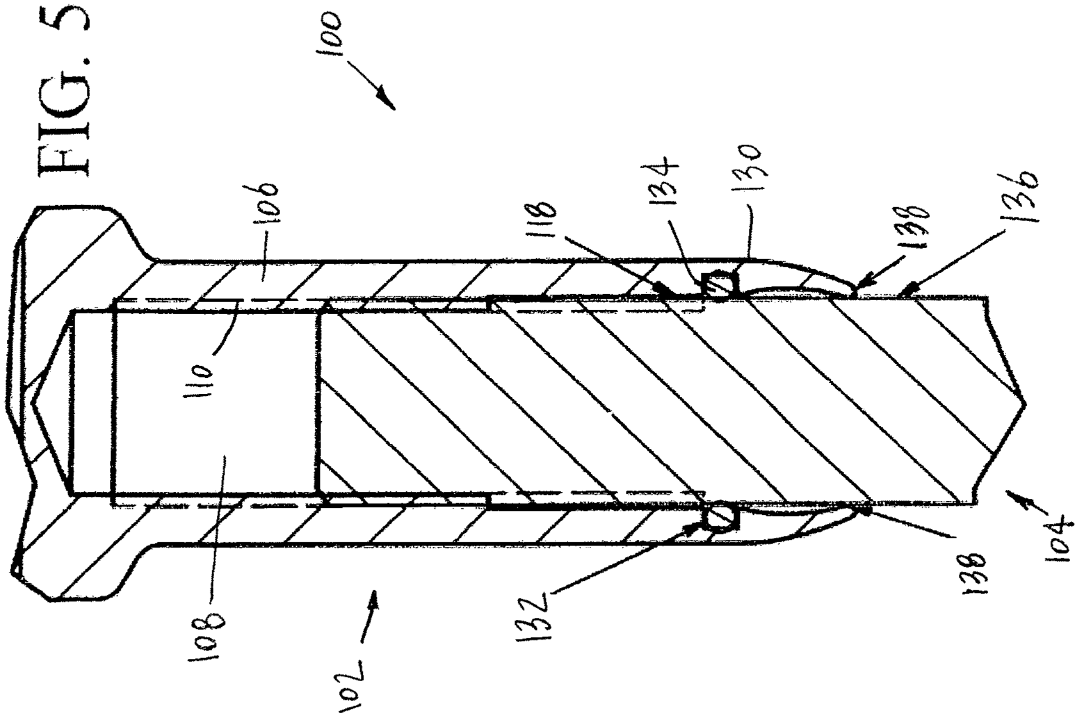
FIG. 5 is an enlarged view of a portion of the adjustable bolt of this disclosure, taken along the detailed line 5 of FIG. 4.
Figure 4:
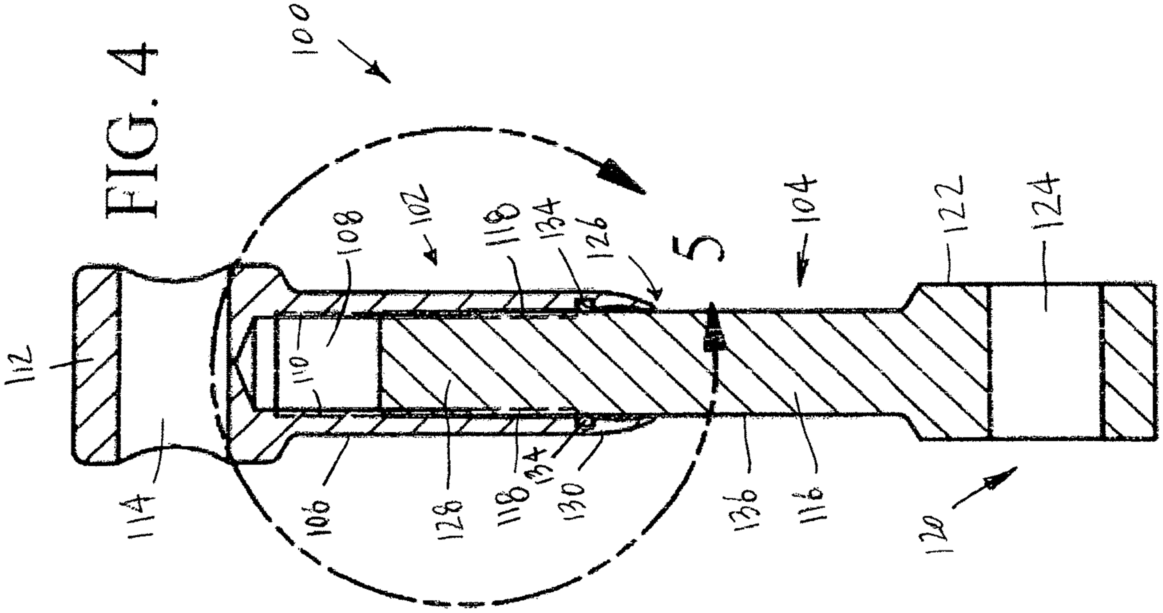
FIG. 4 is a sectional view of the pivot bolt taken along the line 4-4 of FIG. 2.

To add further to the protection that is acquired through the assembly of the components that make up the pivot bolt 100, as can be noted in FIG. 5, within a proximate lower section 130 of the upper cylindrical portion 102 is an internal groove, as at 132, that accommodates the location of an O-ring 134 that biases against a smooth surface 136 that is adjacent and below the threaded portion 118 of the lower bolt portion 104, as it threadedly engages within the upper cylindrical member 102, as can be understood. Since the threaded portion 118 of the lower bolt portion 104 is upwardly of the location of the O-ring 134, the O-ring 134 provides a complete sealing against the smooth surface 136 of the lower bolt portion 104, and the upper cylindrical portion 102, that prevents the upward entrance of any of such debris therein, as can be understood.

Furthermore, as can also be noted, a bottom end 138 of the upper cylindrical portion 102, is contoured inwardly, in close tolerance against the surface 136 of the lower bolt portion 104, and therefore, acts as a scraper for protecting the O-ring 134, and removes any product built up in the category of dust, debris, or even moisture, from the surface 136 of the lower bolt portion 104, as it is inserted inwardly and threaded upwardly and within the upper cylindrical member 102, during its assembly, and adjustment. Hence, this feature, in combination with the O-ring 134, completely avoids the entrance of any deleterious matter into the location of the threaded engagement between these two components 102 and 104 of the pivot bolt 100, and therefore, allows for further adjustments of these components, when the lever assemblies 12 need further adjustment, to assure a tight fitting of the manhole cover 10 upon its seal ring 16, or other supporting structure, during prolonged usage of this improved embodiment for the pivot bolt 100 used within this assembly.

Hence, as can be understood, there are just no longer any exposed threads, or even access to the threads, through the usage of the aligned components that form the adjustable pivot bolt 100 of this disclosure.

Variations or modifications to the subject matter of this disclosure may occur to those skilled in the art upon review of the sealed manhole clamp as described herein. Such variations, if within the spirit of this disclosure, are intended to be encompassed within the scope of any claims to patent protection issuing herein. The review of the sealed manhole clamp as set forth in the Specification, and its depiction in the drawings, are primarily set forth for illustrative purposes only.

What is claimed is:

1. An adjustable pivot bolt for a sealed manhole clamp for use in a vertically upright orientation for securing a manhole cover to a weld ring upon an upper opening of a tank trailer, dry bulk trailer, or other conveying vehicle, the adjustable pivot bolt comprising:

a cylindrical upper portion having internal threads inside an internally threaded channel and a boss having an aperture;

a lower bolt portion positioned vertically below the cylindrical upper portion and having a length having a threaded portion with the threaded portion positioned inside the internally threaded channel and engaging with the internal threads in the internally threaded channel of the cylindrical upper portion and a bottom having a boss having an aperture; and the threaded portion of the lower bolt portion is completely contained within the internally threaded channel of the cylindrical upper portion and the threaded portion of the lower bolt portion does not extend outside the internally threaded channel of the cylindrical upper portion.

2. The adjustable pivot bolt of claim 1 wherein the lower bolt portion further comprises a smooth surface portion along the length of the lower bolt portion and adjacent the threaded portion of the lower bolt portion.

3. The adjustable pivot bolt of claim 1 wherein the cylindrical upper portion has a downward open end at a bottom of the cylindrical upper portion for receiving the threaded portion of the lower bolt portion extending upward through the downward open end and into the internally threaded channel.

4. The adjustable pivot bolt of claim 1 wherein the threaded portion of the lower bolt portion extends along a portion of the length of the lower bolt portion between an upper end of the lower bold portion and an adjacent smooth surface of the lower bold portion.

5. The adjustable pivot bolt of claim 1 wherein the cylindrical upper portion has a length and the internally threaded channel extends along a portion of the length of the cylindrical upper portion.

6. The adjustable pivot bolt of claim 1 wherein the aperture formed in the boss of the cylindrical upper portion is adapted to receive a pivot pin and the aperture formed in the boss of the lower bolt portion is adapted to receive another pivot pin.

7. An adjustable pivot bolt for use in a vertical orientation for securing, the adjustable pivot bolt comprising:

a cylindrical upper portion having internal threads inside an internally threaded channel, a boss having an aperture, and an internal groove adjacent the internal threads;

an O-ring positioned within the internal groove and adjacent the internal threads;

a lower bolt portion positioned vertically below and extending upward into the internally threaded channel of the cylindrical upper portion, the lower bolt portion having a length with the length having a threaded portion, the threaded portion of the length engaging with the internally threaded channel of the cylindrical upper portion and the lower bolt portion having a bottom having a boss having an aperture; and the threaded portion of the length of the lower bolt portion is positioned completely within the internally threaded channel of the cylindrical upper portion.

8. The adjustable pivot bolt of claim 7 wherein the lower bolt portion further comprises a smooth surface portion along the length of the lower bolt portion, the smooth surface portion being adjacent the threaded portion of the length of the lower bolt portion, and the O-ring biasing against the smooth surface portion of the length of the lower bolt portion for providing a seal against the smooth surface.

9. The adjustable pivot bolt of claim 7 wherein the lower bolt portion further comprises a smooth surface portion along the length of the lower bolt portion; and the O-ring engages against the smooth surface portion adjacent the threaded portion of the length of the lower bolt portion.

10. The adjustable pivot bolt of claim 7 wherein the cylindrical upper portion has an open end receiving the threaded portion of the length of the lower bolt portion extending upward through the open end.

11. The adjustable pivot bolt of claim 7 wherein the threaded portion of the lower bolt portion extends along a portion of the length of the lower bolt portion positioned above the O-ring.

12. The adjustable pivot bolt of claim 7 wherein the cylindrical upper portion has a length and the internal threads inside the internally threaded channel extend along a portion of the length of the cylindrical upper portion above the internal groove.

13. The adjustable pivot bolt of claim 7 wherein the aperture formed in the boss of the cylindrical upper portion is adapted to receive a pivot pin and the aperture formed in the boss of the lower bolt portion is adapted to receive another pivot pin.

14. An adjustable pivot bolt for use in a vertical orientation for securing, the adjustable pivot bolt comprising:

a cylindrical upper portion having internal threads inside an internally threaded channel and a boss having an aperture;

a lower bolt portion positioned vertically below the cylindrical upper portion and having a length having a threaded portion with the threaded portion positioned inside the internally threaded channel and engaging with the internal threads in the internally threaded channel of the cylindrical upper portion, a smooth surface positioned adjacent and below the threaded portion of the length of the lower bolt portion, and a bottom having a boss having an aperture;

the cylindrical upper portion having a bottom end being contoured inwardly and close tolerance against the smooth surface of the lower bolt portion with the bottom end acting as a scraper for removing any product buildup from the smooth surface of the lower bolt portion when the adjustable pivot bolt is adjusted; and the threaded portion of the lower bold portion is contained completely within the internally threaded channel of the cylindrical upper portion.

15. The adjustable pivot bolt of claim 14 wherein the cylindrical upper portion has an open bottom end for receiving the threaded portion of the lower bolt portion extending upward through the open bottom end.

16. The adjustable pivot bolt of claim 14 wherein the lower bolt portion has a smooth surface and the threaded portion of the lower bolt portion extends along a portion of the length of the lower bold portion above the smooth surface.

17. The adjustable pivot bolt of claim 14 wherein the threaded portion of the length of the lower bolt portion engaging with the internally threaded channel of the cylindrical upper portion is contained completely inside the internally threaded channel.

* * * * *